UNITED STATES PATENT OFFICE.

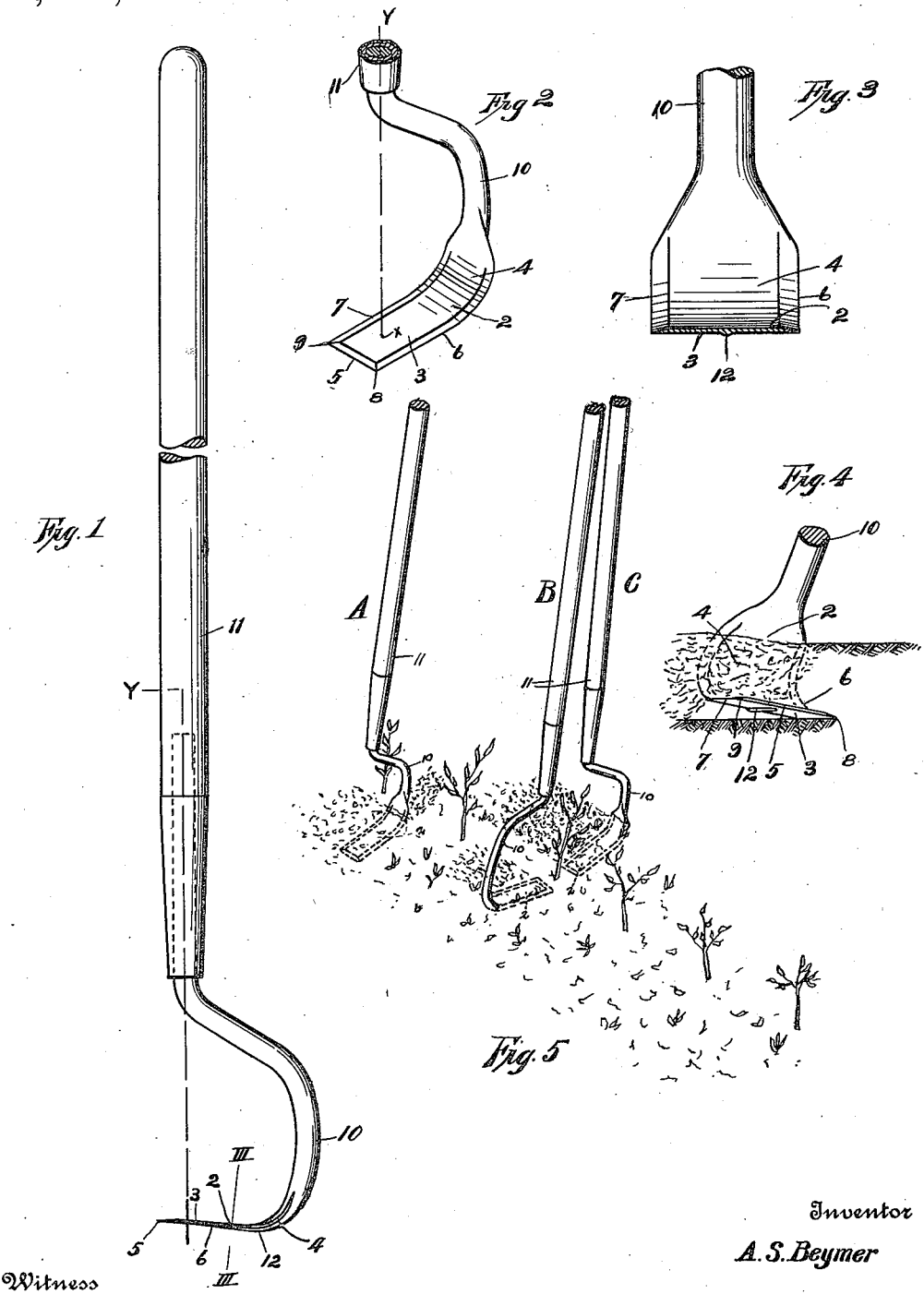

ADELBERT S. BEYMER, OF KANSAS CITY, MISSOURI.

GARDEN IMPLEMENT.

1,185,581.　　　　Specification of Letters Patent.　　Patented May 30, 1916.

Application filed July 30, 1915. Serial No. 42,730.

*To all whom it may concern:*

Be it known that I, ADELBERT S. BEYMER, a citizen of the United States, residing at Kansas City, in the county of Jackson and State of Missouri, have invented certain new and useful Improvements in Garden Implements, of which the following is a full and exact specification.

The present invention relates to an improved garden implement for work in cultivating and pulverizing the soil, one object being to provide a light and effective construction adapted to penetrate hard soil with ease, and which will operate around and between closely growing plants without injury thereto.

A further object is an implement construction which is adapted to be drawn through the soil in a manner which will permit the soil to pass over the implement blade by virtue of a combined horizontal and vertical cutting action, thereby effectively removing the weeds while producing what is known as a dry soil mulch upon the surface of the soil.

It is also aimed to provide a working blade so arranged with relation to the handle that the axial line of the latter intersects the center of working resistance of the blade, with the result that the working position of the blade is instinctively controlled, and any tendency of the handle to twist in the hands of the operator is also practically eliminated. This arrangement of the handle with reference to the tool is further designed to enable the operator to cultivate upon opposite sides of a row of plants with but very slight change or shifting in the position of the handle, so that no change is required in the position of the operator.

With these various objects in view, the invention will now be described by reference to the accompanying drawing forming a part of this specification and illustrating one form of embodiment of the invention in actual practice.

In this drawing Figure 1 is a side view of an implement embodying the present improvements, the handle portion of the device being partly broken away; Fig. 2 is a perspective view of the tool or blade end of the device; Fig. 3 is a section taken on the line III—III of Fig. 1, but on a larger scale; Fig. 4 is a detail perspective of the tool in one of its working positions; and Fig. 5 is a perspective diagram illustrating various operative positions of the implement.

Referring in detail to said drawing, the implement is illustrated as comprising a hoeing or cultivating blade 2 having a major flat portion 3 terminating at one end in a rearwardly curved portion 4. Two or more of the marginal edges of the blade are sharpened to form cutting edges, preferably by beveling said edges on the rear face of the blade. The drawing shows the blade as provided with an end cutting edge 5 and a pair of side cutting edges 6 and 7 forming corners 8 and 9, respectively, with the edge 5, said side cutting edges also extending some distance along said curved portion 4 of the blade.

To the end of the curved portion 4 of the blade is connected in any suitable or preferred manner an angular shank member 10 whereby the blade may be attached to a handle 11 or other means for carrying and manipulating the tool. The drawing illustrates a slight strengthening rib 12 extending from said shank member over the front face of the corresponding end of the blade (see Figs. 1 and 2), and the opposite face of the blade may be reinforced in a similar manner if desired. The shank member 10 is of curved or equivalent angular contour for the purpose of bringing its rear end in substantially axial line with the point $x$ representing the average center or axis of the working resistance of the blade for most of its working positions. This relation of the axial line of the rear end of the shank member (and hence, also, of the handle 11 secured thereto) to the center or axis of the working strains on the blade is illustrated also by the dotted line Y in Figs. 1 and 2, it being noted that this line intersects the flat portion 3 of the blade 2 at the point $x$, which point is midway between the cutting edges 6 and 7 and somewhat nearer to the edge 5 than to the longitudinal center of the blade, since it is the free end of the blade which constitutes the principal working portion of the tool. The axial line of the handle is also slightly out of perpendicular with respect to the plane of the flat portion of the blade for the purpose of positioning the latter with reference to the handle at the angle best adapting the blade for entering the soil as well as for effectively cutting or shearing its way as the tool is advanced.

The foregoing construction provides a simple and efficient means for carrying out the practical objects of the invention. The alinement of the rear end of the shank member 10 and the handle attached thereto so as to intersect the center or axis of the blade's working resistance provides a perfect line of draft axially of the handle from the point of greatest resistance of the tool, and this results in a tool which is easily handled and controlled and obviates any tendency of the handle to twist in the hands of the operator when the implement is worked either sidewise or cornerwise and under considerable working pressure, an objection which applies to the ordinary construction where the principal working portion of the tool blade is located out of line with the handle. The tool in the present case is also light and the blade being narrow it can be readily manipulated to work between small, closely-growing plants (as shown at A, in Fig. 5) or around the same (as illustrated at B, C, same figure). An important feature in this connection resides in the fact that the peculiar alinement of the handle is such that the latter is always pointed directly at the point of cultivation, so that the position of the blade is instinctively controlled by the operator who knows that the handle is directed toward the actual point of operation regardless of the position to which the handle may be rotated, and which obviously would not be the case if the alinement were not as described. This enables the operator to cultivate accurately, speedily, and closely about the plants without any appreciable danger of injury to the same.

In surface cultivation or dry soil mulching the blade takes a position approximately as illustrated in Fig. 4, or at B, C, in Fig. 5, the blade being tilted somewhat transversely and with one of the corners 8, or 9, advanced slightly. The blade then cuts horizontally through the soil just beneath the surface by the action of one of its side edges 6, or 7, with some slight cutting of the end edge 5 as it follows the point 8, or 9, while the curved portion of the edge 6, or 7, produces an approximately vertical cut, so that the soil is free to simply pass over the blade and drop behind the same, as clearly illustrated in Fig. 4. The positioning of the blade with one point 8, or 9, slightly advanced, adapts the edges to cut with a certain degree of shearing action, and the tool moves readily through the soil with but little resistance, and leaves a bed of what is known as soil mulch, the depth of the same depending upon the angle at which the blade is operated.

The provision of the two side cutting edges 6 and 7 adapts the tool for the operation illustrated at B and C in Fig. 5. With the implement in the position B for cultivating the soil on one side of the row of plants, the implement may simply be given a half-turn and but a slight angular shift of the handle to bring it into the position C for working on the opposite side of the row, from which it is clear that the upper portion of the handle scarcely changes in position at all and that the operator may without altering his position cultivate on both sides of the row with equal facility.

While the preferred form of embodiment of the invention has been described and illustrated, the right is reserved to such formal changes and modifications as may be fairly embraced within the scope of the appended claims.

Claims:

1. A garden implement comprising a narrow hoeing blade having two or more meeting edges sharpened for cutting and an angular shank member having one of its ends connected to the upper end of said blade and its other end projecting rearwardly in a line intersecting the blade at the axis of the working resistance.

2. A garden implement comprising a narrow cultivating blade having an end cutting edge and a second cutting edge extending along one side of the blade, and a shank member having one of its ends connected to the upper end of said blade and the other end of said shank member projecting in a line intersecting the blade at the axis of the working resistance.

3. A garden implement comprising a narrow cultivating blade having its lower end sharpened for cutting and having a second cutting edge extending along one side of the blade, and a shank member having one of its ends connected to the upper end of said blade and the other end of said shank member projecting along a line intersecting the axis of the working resistance of the blade at an angle slightly out of perpendicular to the plane of the blade.

4. A garden implement comprising a narrow cutting blade having a flat portion and a curved portion, said flat portion having an end cutting edge extending transversely of the blade and a side cutting edge extending along one side of said flat portion and partly along said curved portion of the blade, and a handle connected to said curved portion of the blade with the axis of said handle intersecting said flat portion of the blade at an angle slightly out of perpendicular to the plane of said flat portion.

5. A garden implement comprising a narrow cutting blade having a flat portion and a curved portion with an end cutting edge extending transversely of the flat portion and side cutting edges on opposite sides of said flat and curved portions, and a handle connected to the end of said curved portion of the blade with the axis of said handle intersecting said flat portion of the blade at an angle slightly out of perpendicular to the plane of said flat portion.

6. A garden implement comprising a narrow cultivating blade having a flat portion and a curved portion, said flat portion having an end cutting edge and side cutting edges on opposite sides of said flat and curved portions, and an angular shank member having one of its ends connected to the end of said curved portion of the blade and its other end projecting in a line intersecting the blade at the axis of the working resistance.

7. A garden implement comprising a narrow cultivating blade having a flat portion and a curved portion with an end cutting edge along the end of said flat portion and a side cutting edge along one side of said flat and curved portions of the blade, and an angular shank member having one of its ends connected to the end of said curved portion of the blade and the other end of said shank member projecting in a line intersecting the blade at the axis of the working resistance.

8. A garden implement comprising a narrow hoeing blade having its lower end edge sharpened for cutting and provided with two side cutting edges extending along the opposite sides of the blade, and an angular shank member having one of its ends connected to the upper end of said blade and the other end of said shank member projecting in a line intersecting the blade at the axis of the working resistance.

ADELBERT S. BEYMER.